Sept. 29, 1953          J. C. ELGIN ET AL                2,653,916
              METHOD OF RECLAIMING SCRAP VULCANIZED MATERIAL
                          Filed June 25, 1953
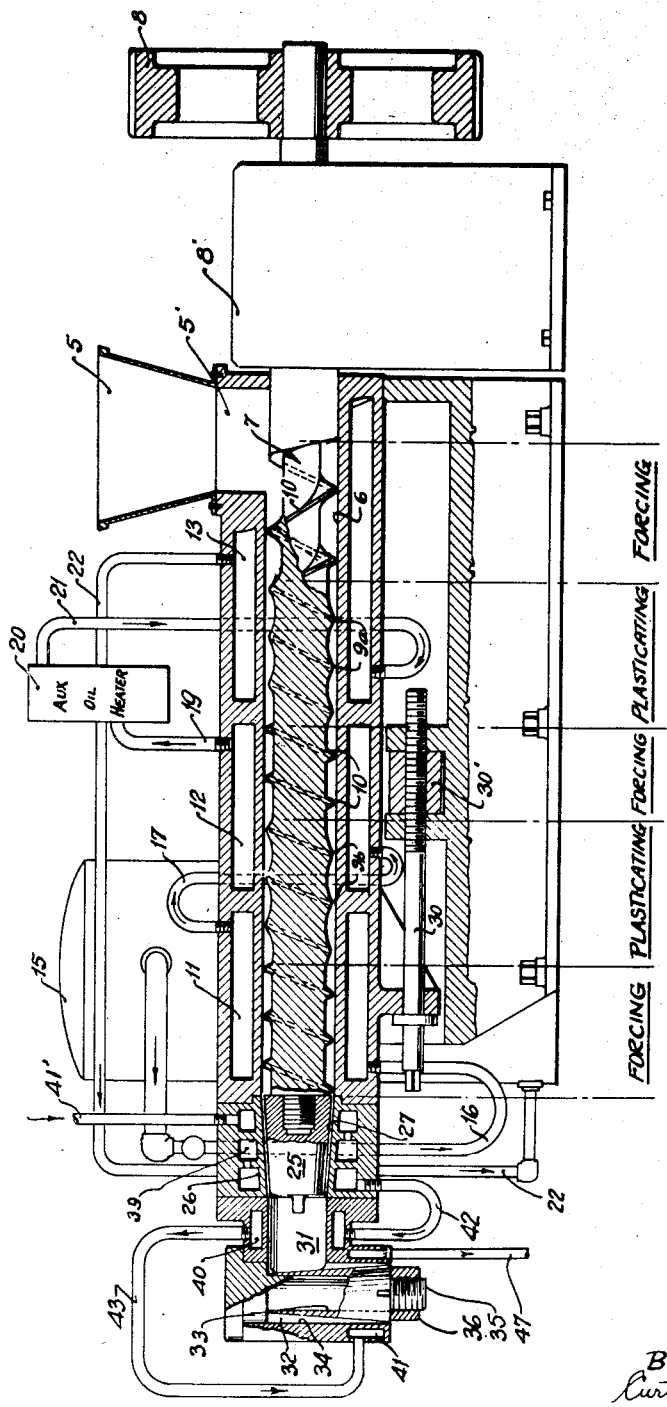
INVENTORS
JOSEPH CLIFTON ELGIN
BY EDWARD F. SVERDRUP
Curtis, Morris & Safford
ATTORNEYS Patented Sept. 29, 1953

2,653,916

UNITED STATES PATENT OFFICE 2,653,916

METHOD OF RECLAIMING SCRAP VULCANIZED MATERIAL

Joseph C. Elgin, Princeton, N. J., and Edward F. Sverdrup, Buffalo, N. Y., assignors to U. S. Rubber Reclaiming Co., Inc., Buffalo, N. Y.

Application June 25, 1953, Serial No. 364,101

7 Claims. (Cl. 260—2.3)

This invention relates to the reclaiming of scrap vulcanized material.

This application is a continuation-in-part of our copending application, Serial No. 193,688, filed November 2, 1950.

Numerous improvements in the reclaiming of rubber have been made in recent years. The use of oxido-plasticization agents and other chemical plasticization agents as proposed by ourselves and others has made possible the production of improved reclaims in a simpler and more effective manner. We have shown, moreover, that by carrying out reclaiming processes at temperature ranges of over about 325° F. (and, preferably up to 475-500° F.), improvements in both process and product may be obtained. References to temperatures herein are to those as have been, or may be, externally measured; it being understood that where, as in the illustrated apparatus, the materials are placed under compacting pressure in a closed chamber, the temperature of which, of necessity, as in the case of other heat-generating mechanical processes, is measured externally of the chamber, the measured temperature may be less than the actual temperature.

We have shown further that even greater improvements may be obtained by the mechanical working of the rubber under conditions wherein temperatures within such ranges are generated by the working.

We have now found, however, that, surprisingly, by the use of certain classes of agents in processes involving heat-generating mechanical working we can obtain results which are distinctly superior to any heretofore obtained.

One class of such agents are unsaturated acids having a double bond linking two carbon atoms one of which is linked by a single bond to a carbon atom which has oxygen attached thereto but which is not directly attached to another carbon atom. Why such compounds are particularly effective in such action has not been fully determined. Perhaps it is due to their ability to re-link rubber molecules at the point where they are torn apart by the mechanical working. Perhaps it is their ability to link rubber molecules prior to the mechanical working in such a way that the molecules will be later broken at other and more desirable points. Perhaps they have some catalytic activity which is not fully understood. Whether the double bond and/or the —COOH group or part of it enters into the reclaiming action chemically, catalytically or otherwise, is at present not determined, but that such materials do cooperate in some highly effective manner with a progressive mechanical working is established. At all events, they cooperate in some highly effective way in the conversion activity induced by the rapid and heat-generating mechanical working, and are highly effective in their action.

It is to be noted that the term "acid" as used herein includes not only materials containing one or more —COOH groups but also the anhydrides thereof, and the naming of particular acids includes the isomers thereof with the characteristic C=C—C=O grouping, unless the context requires otherwise.

As will be appreciated, there are some compounds, such, for example, as citric acid, which do not of themselves contain a double bond but which are capable of providing such agents under the conditions of the process.

Examples of acids which are effective in accordance with invention are maleic and fumaric acids, the former, for example, in the form of the anhydride, and the latter, for example, in the form of the —COOH compound; itaconic acid; mesaconic acid; citraconic acid; aconitic acid; those of the above or other acids produced when citric acid is added to the mix; cinnamic acid; crotonic acid; sorbic acid; and chloromaleic acid, in the form of the anhydride, for example.

The drawing illustrates in longitudinal section a form of apparatus used in various of the examples hereinafter set forth.

In the form of apparatus illustrated, crumb material to be reclaimed is supplied to the hopper 5 so as to maintain always a supply above the feed opening 5'. The material drops from the hopper 5 into a tubular chamber 6 in which is a screw-type rotor 7. This screw is connected to suitable driving means thru the drive gear 8 and speed reducer 8'.

In certain longitudinal portions of the chamber 6 a narrow clearance is provided between the flights 9$^a$ and 9$^b$ of the rotor and the inner wall of the chamber; and these flights are designed to provide for working of the material by their sloping, rounded contours, as well as the clearance already mentioned, thus permitting a portion of the material to work over the flights 9$^a$ and 9$^b$. In other longitudinal portions of the rotor, its flights 10 are designed as a typical forcing screw so as to engage the material and feed it continuously along the chamber 6. The clearance at the tops of flights 9$^a$ and 9$^b$ may be $\frac{1}{32}$ of an inch. The depths and differences in contours in the several portions of the rotor are designed to produce mechanical working of the material while maintaining it in intimate relation with the wall of chamber 6, the temperature of which is controlled by fluid circulating in jacket portions 11, 12, and 13.

In the present instance, the screw thread is formed to provide two "plasticating" sections 9ª and 9ᵇ flanked by three "forcing" sections 10 as indicated. In these sections heat is rapidly developed by mechanical working of the material and friction against the moving parts.

At the discharge end of the screw part of rotor 7 and chamber 6 is an extrusion section composed of a conical extension 25 on the rotor 7 and the extension 26 of the chamber 6. The clearance between these parts is such that only well plasticized rubber flows thru it, and such rubber is cooled by intimate contact, in thin section, with the wall of chamber 26.

Dissipation of heat generated by mechanical action during extrusion thru zone 27 and some cooling of the stock below its temperature in the active treating zone is carried out in zone 27.

From the zone 27 the material gathers in a chamber 31, whence it passes into the annular chamber 32, in which it is then subjected to further cooling and compacting by extrusion thru the discharge orifice 33. As shown, this is adjustable by turning nut 36 on the threaded pin 35. This also regulates back-pressure which affects the rate of flow, and presses out entrapped air.

In the zones 27, 31 and 32 the temperature is reduced, by external cooling, from one within the reclaiming range (of from 300–325° F. to 475–500° F.) to one preferably not over 325° F.

The cone 25, the tube 34 and the conduit 31 are, respectively, cooled by jackets 39, 40 and 41 thru which a cooling liquid, e. g., water at controlled temperature, e. g., at about 175–195° F., is circulated from pipe 41' and by pipes 42 and 43. A discharge pipe 47 runs from jacket 41 to a recycle cooler and pump or to discharge.

The apparatus is drawn substantially to scale for a 3" outer diameter screw. The space 27 between the cone 25 and the tube 26 may be about 0.030", but is adjustable by the bolt 30 engaging nut 30' secured to the bed of the machine. The orifice at the outlet of chamber 32 may be 2½" in external diameter and 2⅛" in internal diameter. As will appear, effective results are obtained when the material moves thru the reclaiming chamber at the rate of over 50 pounds per hour.

Altho in this specification we disclose a preferred embodiment of our invention and various alternatives and modifications thereof, it is to be understood that these are not intended to be exhaustive nor limiting of the invention, but, on the contrary, are given with a view to illustrating and explaining the principles of the invention and their embodiment for practical use, in order that others skilled in the art may be enabled to adapt and modify them in numerous embodiments and modifications, each as may be best adapted to the condition of any particular use.

Example 1

95 parts of vulcanized natural rubber tire peels defiberized and ground to 24 mesh size were thoroly mixed with 1.0 part of maleic acid, 2.5 parts of a pine distillate the active portion of which is terpinolene, 1.5 parts of engine oil, 1.0 part of styrene, 0.5 part of lecithin and 1.5 parts of water. The resulting mixture was passed thru a 3" worm extruder such as described above.

The transit time was 2.5 minutes, the flow being about 74 pounds per hour $$\left(\frac{3.1}{2.5} \times 60\right)$$

where 3.1 is the conversion factor from time in minutes to pounds per minute for the particular machine illustrated). The jacket temperature was about 304° F. and the recorded temperature in the machine was 376° F. The resulting reclaim had a specific gravity of 1.137 and a Williams plasticity number of 3.49. When tested in the Reclaimer's Association Formula based on 50% hydrocarbon content, the following results were obtained:

| Cure @ 287° F. | Tensile, lbs. per sq. in. | Elongation, percent | Hardness |
|---|---|---|---|
| 20 minutes | 1,617 | 433 | 45 |
| 25 minutes | 1,709 | 430 | 46 |
| 30 minutes | 1,747 | 417 | 48 |

Example 2

95 parts of vulcanized natural rubber tire peels defiberized and ground to 24 mesh size were thoroly mixed with 0.5 part of maleic anhydride, 1.5 parts of petroleum solvent, 1.5 parts of engine oil, 0.5 part of lecithin, and 1.5 parts of water. The resulting mixture was passed thru a 3" worm extruder such as described above. The transit time was 2.3 minutes, the flow being about 80 pounds per hour. The jacket temperature was about 302° F. and the recorded temperature in the machine was 379° F. The resulting reclaim had a specific gravity of 1.137 and a Williams plasticity number of 4.50. When tested in the Reclaimer's Association Formula based on 50% hydrocarbon content, the following results were obtained:

| Cure @ 287° F. | Tensile, lbs. per sq. in. | Elongation, percent | Hardness |
|---|---|---|---|
| 20 minutes | 1,050 | 320 | 44 |
| 25 minutes | 1,109 | 317 | 45 |
| 30 minutes | 1,148 | 307 | 46 |

Example 3

95 parts of vulcanized Buna S defiberized and ground to 24 mesh size were thoroly mixed with 1.0 part of maleic anhydride, 1.5 parts of petroleum solvent, 18.0 parts of petroleum resin, 0.5 part of lecithin and 1.5 parts of water. The resulting mixture was passed thru a 3" worm extruder such as described above. The transit time was 3.1 minutes, the flow being about 60 pounds per hour. The jacket temperature was about 302° F. and the recorded temperature in the machine was 390° F. The resulting reclaim had a specific gravity of 1.117 and a Williams plasticity number of 5.19. When tested in the Reclaimer's Association Formula based on 50% hydrocarbon content, the following results were obtained:

| Cure @ 287° F. | Tensile, lbs. per sq. in. | Elongation, percent | Hardness |
|---|---|---|---|
| 20 minutes | 774 | 400 | 35 |
| 25 minutes | 800 | 403 | 37 |
| 30 minutes | 971 | 387 | 40 |

Example 4

95 parts of vulcanized Buna S defiberized and ground to 24 mesh size were thoroly mixed with 1.0 part of citric acid, 18.0 parts of petroleum resin, 1.5 parts of petroleum solvent, 0.5 part of lecithin and 1.5 parts of water. The resulting mixture was passed thru a 3" worm extruder such as described above. The transit time was 3.5 minutes, the flow being about 53 pounds per hour. The jacket temperature was about 300° F. and the recorded temperature in the machine was 382° F. The resulting reclaim had a specific gravity of 1.129 and a Williams plasticity number of 5.63. When tested in the Reclaimer's Association Formula based on 50% hydrocarbon content, the following results were obtained:

| Cure @ 287° F. | Tensile, lbs. per sq. in. | Elongation, percent | Hardness |
|---|---|---|---|
| 20 minutes | 648 | 357 | 40 |
| 25 minutes | 751 | 337 | 41 |
| 30 minutes | 873 | 337 | 43 |

Example 5

95 parts of vulcanized natural rubber tire peels defiberized and ground to 24 mesh size were thoroly mixed with 0.75 part of citric acid, 1.5 parts of petroleum solvent, 1.5 parts of engine oil, 0.5 part of lecithin and 1.5 parts of water. The resulting mixture was passed thru a 3" worm extruder such as described above. The transit time was 3.0 minutes, the flow being about 63 pounds per hour. The jacket temperature was about 304° F. and the recorded temperature in the machine was 373° F. The resulting reclaim had a specific gravity of 1.128 and a Williams plasticity number of 4.59. When tested in the Reclaimer's Association Formula based on 50% hydrocarbon content, the following results were obtained:

| Cure @ 287° F. | Tensile, lbs. per sq. in. | Elongation, percent | Hardness |
|---|---|---|---|
| 20 minutes | 878 | 290 | 43 |
| 25 minutes | 923 | 283 | 45 |
| 30 minutes | 929 | 270 | 47 |

Example 6

100 parts of tire peels (50% natural and 50% Buna S) defiberized and ground to 18 mesh size were thoroly mixed with 3.0 parts of citric acid, 5.0 parts of petroleum asphalt, 3.7 parts of petroleum resin and 1.5 parts of water. The resulting mixture was passed thru a 3" worm extruder such as described above. The transit time was 3.5 minutes, the flow being about 53 pounds per hour. The jacket temperature was about 263° F. and the recorded temperature in the machine was 325° F. The resulting reclaim had a specific gravity of 1.141 and a Williams plasticity number of 4.89. When tested in the Reclaimer's Association Formula based on 50% hydrocarbon content, the following results were obtained:

| Cure @ 287° F. | Tensile, lbs. per sq. in. | Elongation, percent | Hardness |
|---|---|---|---|
| 25 minutes | 1,498 | 297 | 50 |
| 30 minutes | 1,400 | 353 | 52 |
| 35 minutes | 1,410 | 333 | 52 |

Example 7

100 parts of tire peels (50% natural and 50% Buna S) defiberized and ground to 24 mesh size were thoroly mixed with 0.5 part of citric acid, 1.5 parts of petroleum solvent, 3.7 parts of petroleum resin, 5.0 parts of petroleum asphalt and 1.0 parts of water. The resulting mixture was passed thru a 3" worm extruder such as described above. The transit time was 2.6 minutes, the flow being about 72 pounds per hour. The jacket temperature was about 260° F. and the recorded temperature in the machine was 308° F. The resulting reclaim had a specific gravity of 1.146 and a Williams plasticity number of 3.67. When tested in the Reclaimer's Association Formula based on 50% hydrocarbon content, the following results were obtained:

| Cure @ 287° F. | Tensile, lbs. per sq. in. | Elongation, percent | Hardness |
|---|---|---|---|
| 25 minutes | 805 | 317 | 42 |
| 30 minutes | 763 | 297 | 43 |
| 35 minutes | 833 | 290 | 44 |

Example 8

95 parts of vulcanized natural rubber tire peels defiberized and ground to 24 mesh size were thoroly mixed with 0.5 part of aconitic acid, 1.5 parts of petroleum solvent, 1.5 parts of engine oil, 0.5 part of lecithin and 1.5 parts of water. The resulting mixture was passed thru a 3" worm extruder such as described above. The transit time was 2.6 minutes, the flow being about 73 pounds per hour. The jacket temperature was about 304° F. and the recorded temperature in the machine was 368° F. The resulting reclaim had a specific gravity of 1.125 and a Williams plasticity number of 3.95. When tested in the Reclaimer's Association Formula based on 50% hydrocarbon content, the following results were obtained:

| Cure @ 287° F. | Tensile, lbs. per sq. in. | Elongation, percent | Hardness |
|---|---|---|---|
| 20 minutes | 865 | 317 | 48 |
| 25 minutes | 922 | 310 | 49 |
| 30 minutes | 975 | 300 | 50 |

Example 9

90 parts of vulcanized natural rubber peels defiberized and ground to 24 mesh size were thoroly mixed with 0.5 part of crotonic acid, 1.5 parts of petroleum solvent, 1.5 parts of engine oil, 0.5 part of lecithin, and 1.5 parts of water. The resulting mixture was passed thru a 3" worm extruder such as described above. The transit time was 3.5 minutes, the flow being about 54 pounds per hour. The jacket temperature was about 304° F. and the recorded temperature in the machine was 364° F. The resulting reclaim had a specific gravity of 1.131 and a Williams plasticity number of 3.89. When tested in the Reclaimer's Association Formula based on 50% hydrocarbon content, the following results were obtained:

| Cure @ 287° F. | Tensile, lbs. per sq. in. | Elongation, percent | Hardness |
|---|---|---|---|
| 20 minutes | 917 | 307 | 47 |
| 25 minutes | 926 | 276 | 49 |
| 30 minutes | 931 | 280 | 50 |

Example 10

95 parts of vulcanized natural rubber tire peels defiberized and ground to 24 mesh size were thoroly mixed with 0.75 part of sorbic acid, 1.5 parts of petroleum solvent, 1.5 parts of engine oil, 0.5 part of lecithin and 1.5 parts of water. The resulting mixture was passed thru a 3" worm extruder such as described above. The transit time was 3.7 minutes, the flow being about 50 pounds per hour. The jacket temperature was about 302° F. and the recorded temperature in the machine was 366° F. The resulting reclaim had a specific gravity of 1.129 and a Williams plasticity number of 3.93. When tested in the Reclaimer's Association Formula based on 50% hydrocarbon content, the following results were obtained:

| Cure @ 287° F. | Tensile, lbs. per sq. in. | Elongation, percent | Hardness |
| --- | --- | --- | --- |
| 20 minutes | 988 | 313 | 47 |
| 25 minutes | 987 | 287 | 49 |
| 30 minutes | 996 | 280 | 51 |

Example 11

95 parts of vulcanized natural rubber tire peels defiberized and ground to 24 mesh size were thoroly mixed with 0.5 part of itaconic acid, 1.5 parts of petroleum solvent, 1.5 parts of engine oil, 0.5 part of lecithin and 1.5 parts of water. The resulting mixture was passed thru a 3" worm extruder such as described above. The transit time was 2.9 minutes, the flow being about 64 pounds per hour. The jacket temperature was about 302° F. and the recorded temperature in the machine was 367° F. The resulting reclaim had a specific gravity of 1.120 and a Williams plasticity number of 4.23. When tested in the Reclaimer's Association Formula based on 50% hydrocarbon content, the following results were obtained:

| Cure @ 287° F. | Tensile, lbs. per sq. in. | Elongation, percent | Hardness |
| --- | --- | --- | --- |
| 20 minutes | 661 | 310 | 37 |
| 25 minutes | 692 | 300 | 39 |
| 30 minutes | 681 | 277 | 40 |

Example 12

Using a machine similar to that described above, but with a six-inch screw and the other parts proportionately larger, 95 parts of 24 mesh natural peels were mixed with 0.50 part of citric acid, 1.50 parts of engine oil, 1.50 parts of petroleum solvent (#132) and 0.70 part of water. This was processed at the rate of 100 pounds per hour at 40 R. P. M. at a temperature of 405° F. for 8.8 minutes.

Example 13

Using the machine shown in the drawings, 95.00 parts of 24 mesh natural rubber peels were mixed with 0.50 part of tertiary dodecyl mercaptan, 1.50 parts of petroleum solvent, 1.50 parts of engine oil, 0.50 part of lecithin, and 1.50 parts of water. Prior to processing, 1.0 part of maleic anhydride were added. This mix was then processed for 2.37 minutes at 369° F. with a worm speed of 60 R. P. M. yielding a production rate of 75.9 pounds per hour. The reclaim had a specific gravity of 1.122 and a Williams plasticity number of 3.72.

Example 14

73 parts of neoprene glove scrap ground to 12 mesh size were thoroly mixed with 20.0 parts of petroleum resin, 1.5 parts of mercaptobenzothiozole, 0.75 part of citric acid and 1.13 parts of water. The resulting mixture was passed thru a 3" worm extruder such as described above. The transit time was 2.0 minutes, the flow being about 93 pounds per hour. The jacket temperature was about 275° F. and the recorded temperature in the machine was 321° F. The resulting reclaim had a specific gravity of 1.302 and a Williams plasticity number of 5.79. When tested in the neoprene test formula,[1] the following results were obtained:

| Cure @ 307° F. | Tensile, lbs. per sq. in. | Elongation | Hardness |
| --- | --- | --- | --- |
| 45 minutes | 1,152 | 783 | 35 |
| 60 minutes | 1,198 | 817 | 37 |
| 75 minutes | 1,208 | 807 | 37 |

Example 15

100 parts of butyl tubes ground to 6 mesh size were thoroly mixed with 3.0 parts of petroleum solvent, 0.5 part of citric acid and 1.5 parts of water. The resulting mixture was passed thru a 3" worm extruder such as described above. The transit time was 1.4 minutes, the flow being about 133 pounds per hour. The jacket temperature was about 309° F. and the recorded temperature in the machine was 426° F. The resulting reclaim had a specific gravity of 1.139 and a Williams plasticity number of 4.90. When tested in the butyl test formula,[2] the following results were obtained:

| Cure @ 307° F. | Tensile, lbs. per sq. in. | Elongation | Hardness |
| --- | --- | --- | --- |
| 25 minutes | 1,298 | 547 | 47 |
| 30 minutes | 1,324 | 543 | 48 |
| 45 minutes | 1,375 | 533 | 49 |

Example 16

100 parts of 40-mesh mixed natural and GR-S truck and bus peels were mixed with 2 parts of chloromaleic anhydride, 2 parts of petroleum oil and 12 parts of petroleum resin; and passed thru a 3" plasticator such as described above at a worm speed of 60 R. P. M., a jacket temperature of about 310° F. and a recorded temperature of 350° F. The thruput rate was about 50 pounds per hour. The resulting reclaim had a Mooney viscosity ML/212/1-3 of 47. When cured (RAF 50%) the following results were obtained:

| Cure @ 287° F. | Tensile, lbs. per sq. in. | Elongation | Hardness | 300% Modulus |
| --- | --- | --- | --- | --- |
| 25 minutes | 1,690 | 470 | 44 | 920 |
| 35 minutes | 1,805 | 460 | 45 | 1,055 |
| 45 minutes | 1,885 | 440 | 46 | 1,185 |

[1] Neoprene test formula:
```
Reclaim----------------------------------------- 100.0
Zinc oxide--------------------------------------   8.0
Magnesium oxide--------------------------------   5.0
Stearic acid------------------------------------   1.0
DOTG-------------------------------------------   0.5
Sulphur----------------------------------------   1.0
```
[2] Butyl test formula:
```
Reclaim----------------------------------------- 100.0
Methyl tuads-----------------------------------   0.6
Captax-----------------------------------------   0.6
Ethyl selenac----------------------------------   0.6
Zinc oxide-------------------------------------   2.5
Sulphur----------------------------------------   1.25
Stearic acid-----------------------------------   0.5
```

Example 17

100 parts of 30-mesh mixed natural and GR-S old tire stock were mixed with 2 parts of fumaric acid, 0.3 part of mixed di-xylyl disulfides, 2 parts of Rubbersol #3 (terpene hydrocarbon reclaiming agent) and 12 parts of petroleum resin; and passed thru a 3" plasticator such as described above except that the cone 33 is omitted and the chamber 32 tapered to a rectangular outlet orifice measuring 2.5" to 0.05". The worm speed was 60 R. P. M., the jacket temperature was about 303° F. and the recorded temperature 350° F. The thruput was about 50 pounds per hour. The resulting reclaim had a Mooney viscosity ML/212/1-5 of 43½. When cured (RAF 50%) the following results were obtained:

| Cure @ 287° F. | Tensile, lbs. per sq. in. | Elongation | Hardness |
|---|---|---|---|
| 30 minutes | 885 | 400 | 45 |
| 40 minutes | 870 | 390 | 45 |
| 50 minutes | 920 | 390 | 46 |

Reference above to "whole tire stock," "tire peels," "peel stock," and the like refer to scrap containing approximately equal quantities of vulcanized natural rubber and vulcanized GR-S unless the context requires a different interpretation.

Among the advantages derived from the use of the acids such as set forth above, are improved production rates, retardation of deterioration or degeneration at high temperatures—e. g. good anti-burn characteristics — increased tensile strength values, and markedly improved extrusion and tubing characteristics including faster action and greater smoothness of production.

We claim:

1. The process of reclaiming scrap vulcanized material which comprises mechanically working the scrap under compacting pressure to generate heat sufficient to raise the temperature to over about 325° F. as it moves forward progressively at a rate of not less than about 50 pounds per hour in the presence of an agent which will provide under the conditions of the process an unsaturated carboxylic acid having only hydrocarbon substituents except for radicals of the class consisting of hydroxyl and chlorine, but not having both hydroxyl and chlorine substituents and having a double bond linking two carbon atoms one of which is linked by a single bond to a carbon atom which has oxygen attached thereto but which is not directly attached to another carbon atom.

2. The process of reclaiming scrap vulcanized material which comprises adding to the scrap an acid of the class consisting of maleic, fumaric, citric, crotonic, itaconic, cinnamic, citraconic, acontic, mesaconic, sorbic, and chloromaleic, and mechanically working the scrap under compacting pressure to generate heat sufficient to raise the temperature to over about 425° F. as it moves forward progressively at a rate of at least 50 pounds per hour.

3. The process of reclaiming scrap vulcanized material which comprises adding maleic anhydride to the scrap, and mechanically working the scrap under compacting pressure to generate heat sufficient to raise the temperature to over about 326° F. as it moves forward progressively at a rate of at least 50 pounds per hour.

4. The process of reclaiming scrap vulcanized material which comprises adding citric acid to the scrap and mechanically working the scrap under compacting pressure to generate heat sufficient to raise the temperature to over about 325° F. as it moves forward progressively at a rate of at least 50 pounds per hour.

5. The process of reclaiming scrap vulcanized material which comprises adding cinnamic acid to the scrap and mechanically working the scrap under compacting pressure to generate heat sufficient to raise the temperature to over about 325° F. as it moves forward progressively at a rate of at least 50 pounds per hour.

6. The process of reclaiming scrap vulcanized material which comprises adding itaconic acid to the scrap and mechanically working the scrap under compacting pressure to generate heat sufficient to raise the temperature to over about 325° F. as it moves forward progressively at a rate of at least 50 pounds per hours.

7. The process of reclaiming scrap vulcanized material which comprises adding chloromaleic acid to the scrap and mechanically working the scrap under compacting pressure to generate heat sufficient to raise the temperature to over about 325° F. as it moves forward progressively at a rate of at least 50 pounds per hour.

JOSEPH C. ELGIN.
EDWARD F. SVERDRUP.

No references cited.